May 22, 1934.　　　B. G. DONLEY　　　1,959,859
STEERING AND DRIVING AXLE
Filed May 15, 1930
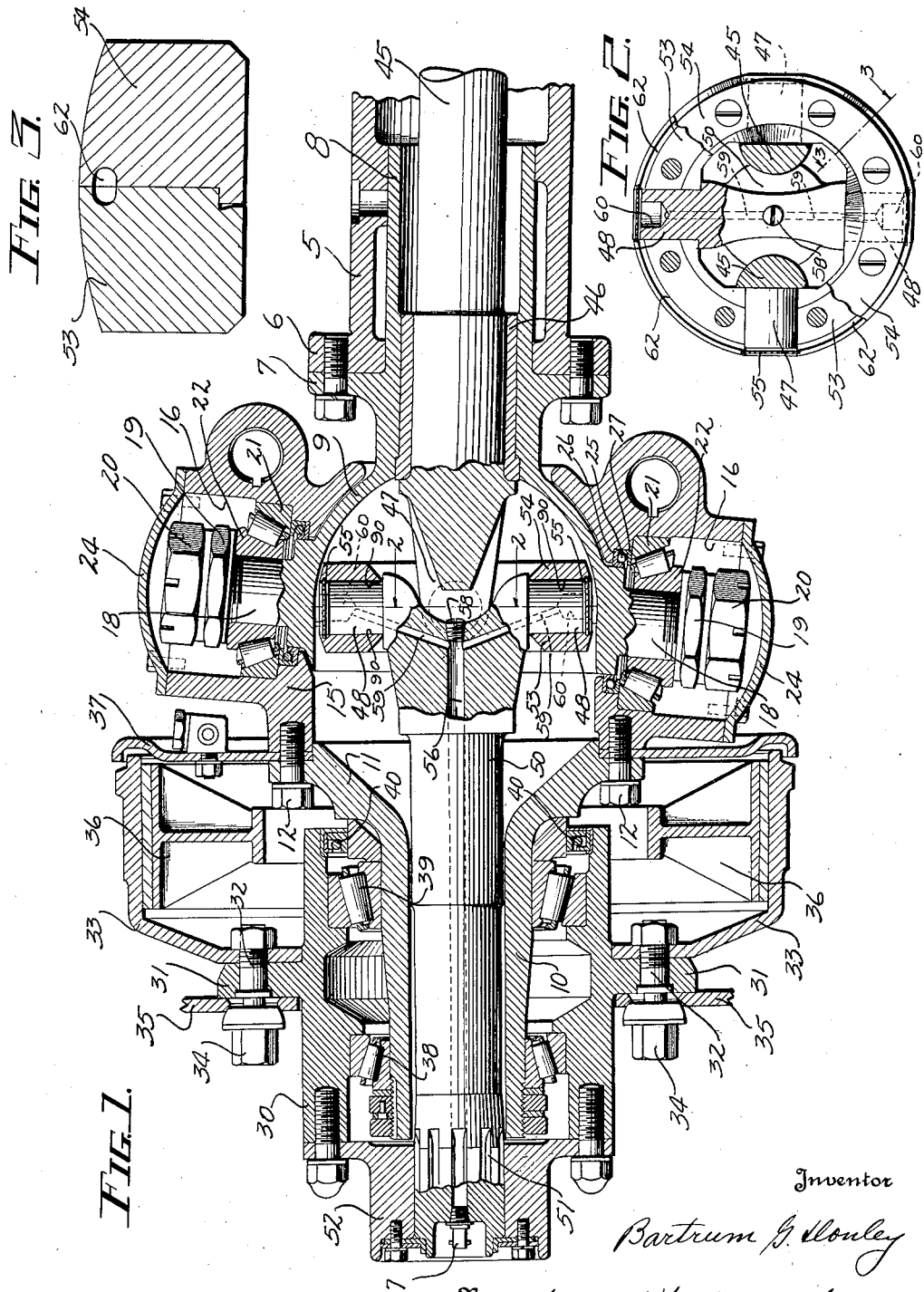
Inventor
Bartrum G. Donley
By Wheeler, Wheeler & Wheeler
Attorneys Patented May 22, 1934

1,959,859

UNITED STATES PATENT OFFICE 1,959,859

STEERING AND DRIVING AXLE

Bartrum G. Donley, Clintonville, Wis., assignor to Four Wheel Drive Auto Company, Clintonville, Wis., a corporation of Wisconsin Application May 15, 1930, Serial No. 452,549

4 Claims. (Cl. 64—102)

This invention relates to improvements in steering and driving axles.

It is the object of the invention to provide a novel and improved axle structure including particularly an improved means of supplying lubricant to the several trunnions in the universal joint of the live axle. A further purpose has to do with improved means for fixing the relative positions of the stationary and dirigible portions of the load bearing axle.

In the drawing:

Figure 1 is an axial section through a structure embodying this invention.

Figure 2 is a detail view showing in end elevation the coupling ring of the universal joint, a portion of one of the component parts of the ring being broken away to expose the face of the other component part thereof.

Figure 3 is an enlarged detail view of the ring in cross section in the plane indicated at 3—3 in Figure 2.

Like parts are identified by the same reference characters throughout the several views.

The load bearing axle 5 is tubular and is provided with an annular flange at 6 to which is screwed the complementary flange 7 of a sleeve 8 upon which the hemispherical housing member 9 is mounted. The axle skein or dirigible portion 10 of the load bearing axle is expanded at 11 and secured by screws 12 to a housing member 15, the interior of which is spherically contoured to fit about the hemispherical housing member 9. Housing member 15 contains bearing recesses 16, aligned upon an axis inclined to the vertical at an angle such as to intersect the plane of the wheel substantially at the point of contact of the tire with the ground. Housing member 15 is preferably divided into component parts in a known manner upon a transverse plane which includes this inclined axis, the component parts being adapted to permit assembly of housing member 15 upon housing member 9 in the manner illustrated.

Housing member 9 is provided with trunnions 18 aligned upon a substantially upright but somewhat inclined steering axis aforesaid. These trunnions project into recesses 16 and are threaded at their ends to receive adjusting nuts 19 and lock nuts 20. The trunnions 18 are journaled in antifriction bearings having complementary races 21 and 22 which are seated in the bottoms of recesses 16 and upon trunnions 18 respectively. Race members 22 are engaged by the adjusting nuts 19 whereby housing member 15 may be symmetrically adjusted for proper clearance with respect to housing member 9. The recesses 16 and the contoured bearing and adjusting parts are closed at their outer ends by caps 24 and at their inner ends by packing arranged between the component parts of the housing and comprising a wick 25 and annuli 26 and 27. This packing not only seals rings 16 but excludes dust from the cavity within the housing in which the universal joint and the live axle operate. The recesses 16 may obviously be packed with grease or supplied with lubricant through pressure fittings in the usual way without the admission of foreign substances.

The hub 30 is provided with a flange 31 to which bolts 32 fasten the brake drum 33. The nuts 34, threaded to such bolts provide for detachable connection of the wheel disk 35 with the hub. The chamber within which the expanding brake shoes 36 operate is closed by a disk 37 which is fixed between housing member 15 and the expanded portion 11 of the dirigible axle skein by means of screws 12.

The hub 30 is carried by two sets of antifriction bearings at 38 and 39 from the skein or dirigible load bearing axle 10, the bearing chamber being closed by packing at 40 similar to that previously described.

The non-dirigible portion 45 of the live axle is provided with a bushing at 46 carrying its end portion from sleeve 8. At its extremity the live axle is forked to provide the usual trunnion-carrying arms 47. Complementary trunnions 48 are carried by corresponding arms at the end of the dirigible portion 50 of the live axle, which is splined at 51 to a hub cap 52 screwed to the end of hub 30. The respective trunnions carried by the component parts of the live axle shaft are interconnected in operative universal joint relation by means of a pair of annuli 53 and 54 having complementary half sockets at 90 which are bolted together upon the several trunnions. The end of each such socket (or at least the sockets in which trunnions 48 are receivable) is sealed by a disk 55 seated in an annular groove undercut in the component parts comprising the socket.

The dirigible portion 50 of the live axle shaft is axially bored at 56 to provide a passage for lubricant admitted through the pressure fitting 57 in the exposed outer end of shaft section 50. The inner end of bore 56 is closed by a plug 58 and communicates with angularly divergent ducts 59 bored inwardly through the studs 48 and their supporting arms from the recesses 60 at the ends of the trunnions.

At least one of the annular bearing members 53 and 54 comprised in the universal joint is provided in its plane face which abuts the other member, with an annular duct or groove 62 affording communication between the several bearing sockets in which the trunnions 48 are received. It is, of course, immaterial whether such groove is formed wholly in one of said members or whether complementary portions thereof are formed in both such members or whether parts of the groove between certain sockets are formed in one member and parts of the groove between other sockets are formed in the other member.

The arrangement described is such that lubricant forced through fitting 57 will traverse bore 56 and be caused to divide and flow through the passage 59 to the recesses 60 and thence to the sockets in which trunnions 48 are received. From these sockets continued pressure will force the lubricant around the curvilinear ducts 62 to the sockets in which trunnions 47 are located.

I claim:

1. In a universal joint, the combination with a plurality of angularly spaced trunnions, of a socketed ring in the sockets of which said trunnions bear, said ring being provided with a duct affording communication between said sockets, imperforate means independent of the trunnion bearing for capping one of said sockets and for providing in said ring a chamber with which said duct directly communicates at all times and means for supplying lubricant thereto, said means including a passage leading through the trunnion positioned in the socket so capped.

2. In a universal joint the combination with angularly spaced trunnions, of means spacing and providing bearings for said trunnions and comprising a pair of complementary rings having opposing faces provided with complementary half sockets in which the respective trunnions bear, one of said faces being grooved between said sockets to provide a conduit for lubricant therebetween, and means for supplying lubricant to said sockets including an open ended reservoir in the other end of one of said trunnions, said groove being located to communicate at all times with said reservoir, and supply means for said reservoir.

3. In a universal joint structure the combination with a shaft having a longitudinal bore provided with a pressure fitting at one end and a plug at the other, of an arm springing from said shaft adjacent the end at which said bore is plugged, a trunnion carried by said arm and provided with a recess opening through the end thereof, a duct leading from said recess through said arm to the plugged end of the bore of said shaft, a coupling ring provided with a bearing for said trunnion closed about said recess and with a second bearing angularly spaced therefrom, closures applied to the ends of said bearings and spaced from said trunnions to provide chambers, and a duct extending circumferentially and exclusively through the coupling ring from the chamber above the recess to the chamber of the second bearing.

4. In a universal joint, the combination with a pair of forked arms each provided with opposed trunnions, of means connecting said arms comprising a ring device having closed sockets in which said trunnions are journaled, duct means extending circumferentially of said ring device to provide permanently open communication between the ends of said sockets beyond said trunnions, and a lubricant conduit extending through one of said arms to the end portion of one of said sockets, whereby to deliver lubricant through said duct to all the sockets unimpeded by any restricted passage between bearing surfaces.

BARTRUM G. DONLEY.